United States Patent [19]
Yablonski

[11] 3,767,993
[45] Oct. 23, 1973

[54] STEPPING MOTOR CONTROL CIRCUIT
[75] Inventor: Robert E. Yablonski, Orange, Calif.
[73] Assignee: Electronic Engineering Co. of California, Santa Ana, Calif.
[22] Filed: Aug. 25, 1971
[21] Appl. No.: 174,823

[52] U.S. Cl. .............................. 318/696, 318/685
[51] Int. Cl. ......................................... H02k 37/00
[58] Field of Search .................. 318/696, 685, 138, 318/254, 439, 415

[56] References Cited
UNITED STATES PATENTS

| | | | |
|---|---|---|---|
| 3,305,713 | 2/1967 | Ikegami | 318/254 |
| 3,636,429 | 1/1972 | Jakubowski | 318/696 |
| 3,345,547 | 10/1967 | Dunne | 318/696 |
| 3,588,661 | 6/1971 | Newell | 318/696 |
| 3,443,181 | 5/1969 | Kozol et al | 318/685 |
| 3,593,096 | 7/1971 | Newell | 318/696 |
| 3,573,592 | 4/1971 | Agin | 318/696 |
| 3,466,520 | 9/1969 | Aylikci et al. | 318/696 |
| 3,452,263 | 6/1969 | Newell | 318/696 |

Primary Examiner—G. R. Simmons
Attorney—Harry R. Lubcke

[57] ABSTRACT

A stepping motor circuit in which the electrical damping period for locking the rotor is automatically inversely variable according to the speed of operation. Three monostable relaxation devices provide required timing for effective stepper motor drive. A differentiating circuit resets either one or two of these devices to decrease the period of damping at high stepping rates. Typically, for high stepping rates, the motor supply voltage is increased to rapidly accelerate the rotor and Zener semiconductor breakdown is used to subsequently dissipate energy from the motor coils.

11 Claims, 2 Drawing Figures

STEPPING MOTOR CONTROL CIRCUIT

BACKGROUND OF THE INVENTION

This invention pertains to control circuits for stepper motors.

A stepper motor revolves incrementally in response to an electrical pulse. However, even at low step rates of a few steps per second, the rotor exhibits considerable overshoot or oscillation about the new position. As an example, a 15° step motor with conventional drive techniques tends to overshoot about 7.5°, a 50 percent overshoot.

The art has evolved certain electrical circuits for energizing stepper motors to overcome, to some degree, the inherent inertial shortcomings of the motor.

The use of a resistor in series with the motor-energizing circuit is an elemental approach for obtaining high stepping speeds with some degree of motional fidelity.

The use of a diode in each phase of the motor windings allows post-excitation current to circulate through the windings and to thus dissipate. This damps electrical oscillations, and so also mechanical oscillations.

Other clamping techniques, such as mechanical damping, retropulsing a step backward after starting, and slowing down the rate of final pulse or pulses, have been used to minimize overshoot. However, these techniques have limitations as the speed of stepping is increased to present-day requirements. For transporting paper tapes, or equivalent webs, for accurately reading information from them, stepping rates up to a maximum of several hundred steps per second must be provided.

While the use of a Zener breakdown mode in the transistor driving each phase of the stepper motor provides a path to ground for unwanted oscillatory electrical energy, the art has employed a capacitor in the normal input circuit. This results in the electrical energy of the first pulse seeking to step the motor to be "wasted" in charging the capacitor.

Typically alone as a means to increase the stepping rate and to minimize over-all power dissipation, a high voltage has been used to initiate stepping while a low voltage has been used for merely holding the rotor in position.

SUMMARY OF THE INVENTION

This invention transcends the performance possible with prior art devices by arranging variable degrees of damping depending upon the operating mode.

It was found that when the power drive transistors were turned back on at essentially the end of the acceleration period of a step, the clamping effect of this current effectively critically damped the rotating mechanical structure. Zener breakdown of the drive transistors may be employed to provide this conduction.

However, in the upper third of the range of attainable maximum stepper speed, a fixed period of damping, effective where needed most at lower stepping rates, is too long. It is still in effect when the next stepping pulse arrives. This causes serious mechanical malfunctioning of the motor in attempting to take another step.

Accordingly, herein, electrical differentiation and one-shot delay circuitry accomplish a reset mode to terminate the otherwise fixed period of damping upon the early arrival of the next stepping pulse at high speeds.

As an assistance in obtaining maximum stepping speeds, each step may be initiated at a high voltage for powering the motor, while a low voltage is used after the rest position has been reached.

DESCRIPTION OF THE PREFERRED EMBODIMENT

Figure 1:
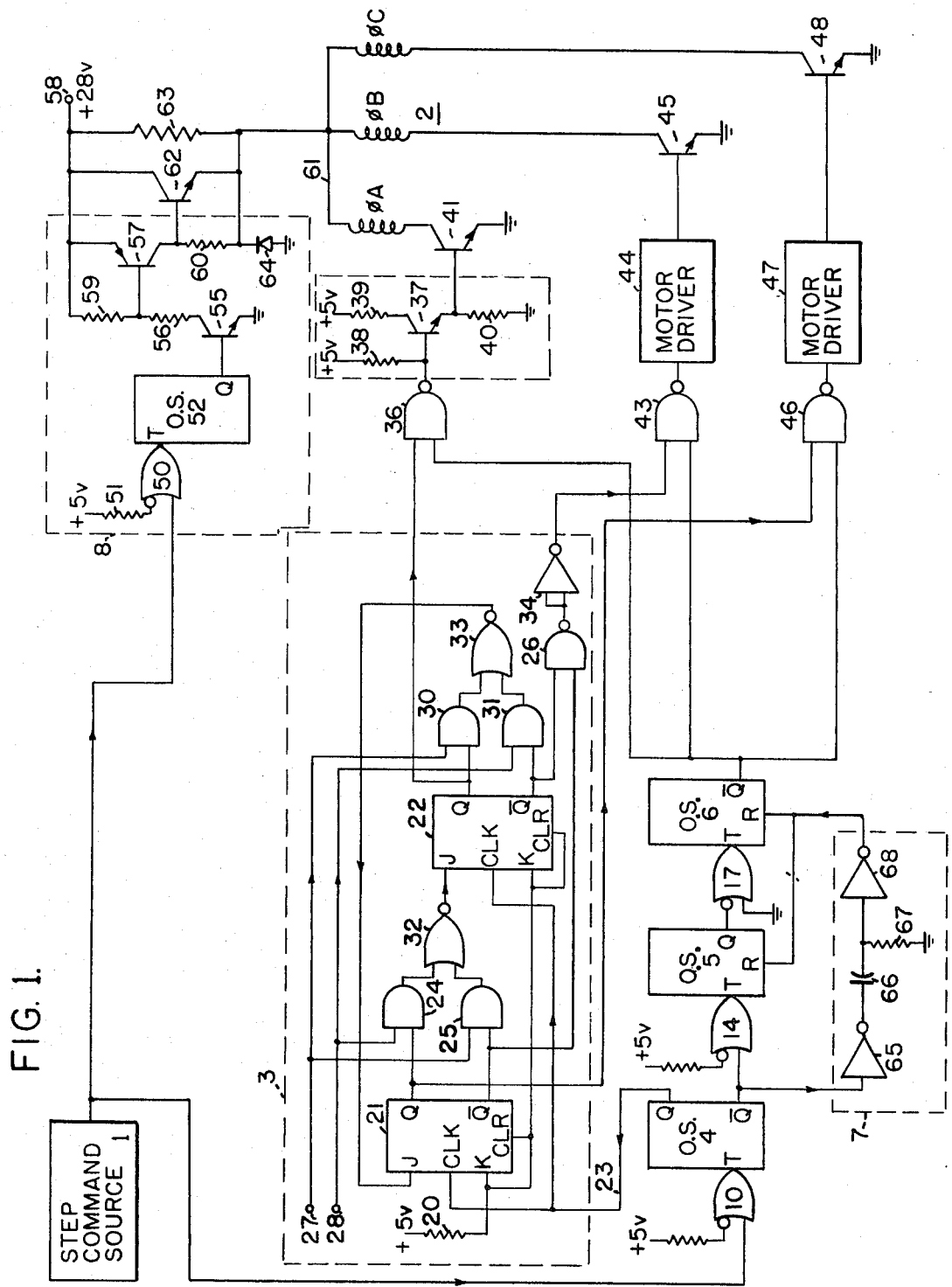
FIG. 1 is a complete circuit diagram of the invention.

In FIG. 1, block 1 is a source of step command pulses. This is a known device, such as a pulse oscillator under operator or computer control, or as output pulses from a computer or other electronic device of a system in which the stepper motor is a part.

Stepper motor 2 preferred for this invention is of the plural phase type. Three phases are shown as illustrative, by stator coils $\phi A$, $\phi B$ and $\phi C$. Suitably timed pulses for each of the coils are produced by logic means, i.e., phase decoding logic elements, within rectangle 3. Required delays for maximizing exciting and damping energization of motor 2 are provided by monostable relaxation devices 4, 5 and 6, which are typically one-shot (O.S.) devices. Electrical differentiating means 7 resets either O.S. 6, or both O.S. 6 and O.S. 5, at high stepping rates.

Means 8 for raising the voltage of the power pulse from a low value employed at resting to a high value for accelerating from one step to the next is also connected to step command source 1, with the output of means 8 connected to each of the stator coils. In operation, means 8 shorts out a resistor otherwise in series with a relatively high voltage source of power which feeds the stator coils.

In the control part of the circuit of FIG. 1 the pulses from step command source 1 pass into one-shot 4 at the T terminal. Gate 10 is an auxiliary input means thereto, being a part of the O.S. as commercially obtainable.

Figure 2:
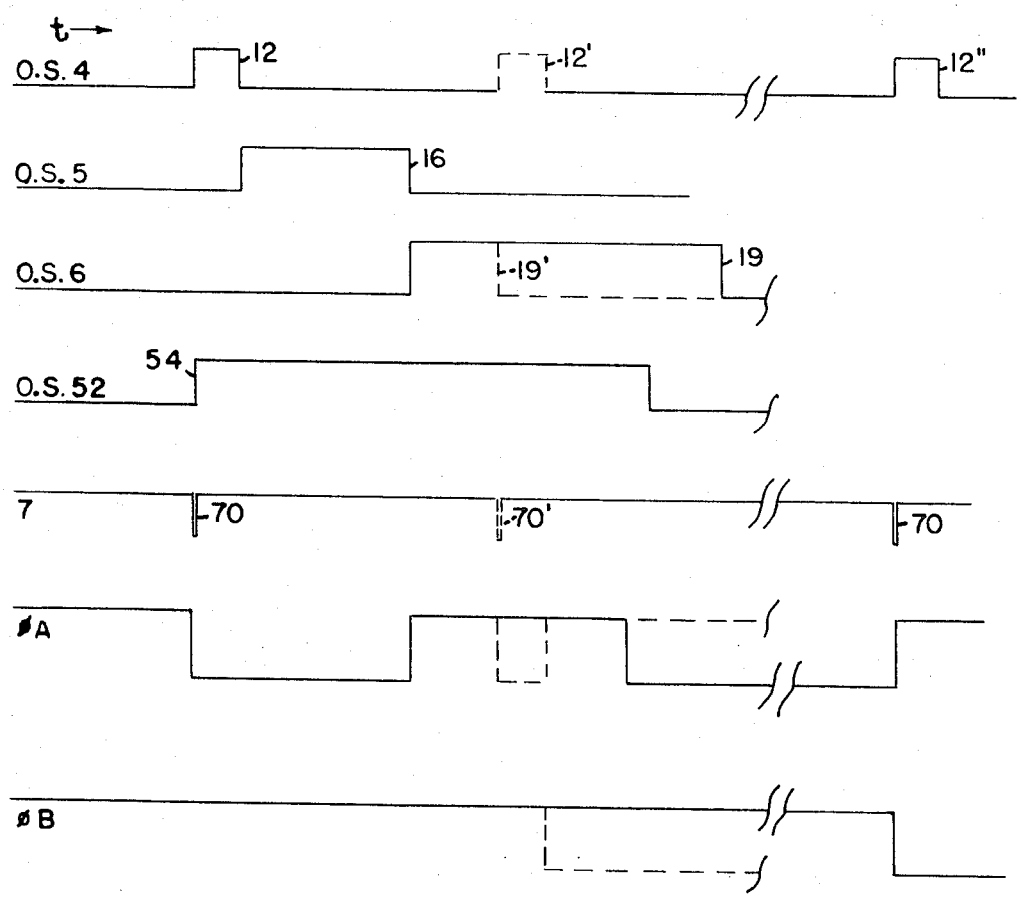
FIG. 2 shows waveforms significant in the novel operation of the circuit.

One-shot 4 has a short duration pulse output, shown at 12 in FIG. 2. Pulse 12' is the next succeeding pulse when the step rate is at or near its maximum value. Pulse 12" is the next succeeding pulse when the step rate has a nominal intermediate value, and is removed in time from pulse 12 relatively far, as indicated by the break in the time axis.

The duration of pulse 12 is of the order of 130 microseconds ($\mu$s) for the illustrative embodiment chosen herein. This is for a three-phase stepper motor having a 15° step of the variable reluctance type and having an impedance of ten ohms. Such motors are available from Computer Devices Corporation, or the IMC corporation. For a lower high voltage from means 8 the duration of pulse 12 may be shorter; for a higher high voltage from means 8 it must be longer, possibly up to twice as long.

One-shot 4 is an obtainable device, such as the Fairchild integrated circuit U5A960259X. It is retriggerable and resettable.

The device operates upon a pulse input going positive from source 1 when the trigger level of typically 2 volts is reached. The output at Q then goes to a logic "one" and remains there for a period of time determined by the time constant of this O.S.

The upper terminal of gate 10 is tied to plus 5 volts to make the lower terminal active to the pulses from source 1.

The $\bar{Q}$ output of O.S. 4 enters the gatepart of O.S. 5 and also differentiating means 7.

O.S. 5 is employed for delay purposes; this also being the acceleration period of the motor. This one-shot is adjusted to give an output pulse at Q of approximately 800 μs duration. As connected, this pulse starts at the termination of pulse 12 from O.S. 4. It is pulse 16 of FIG. 2.

Essentially as before, the output Q from O.S. 5 enters the T terminal of O.S. 6 through OR gate 17. The other input of gate 17 is connected to ground to enable the input of O.S. 6. The $\bar{Q}$ output from O.S. 6 is damping pulse 19 of FIG. 2. It starts at the termination of delay pulse 16 and has a duration in the range of from one to three milliseconds (ms). The value chosen for this duration depends upon the conditions impressed upon the motor; i.e., the inertial load, the friction load, the drive voltage, etc.

Phase decoding logic 3 is comprised of two "J-K" flip-flops and intervening gates. Each flip-flop may be half of an integrated circuit semiconductor chip, type 74107, available from Texas Instruments, Motorola or National Semiconductor corporations.

All of the unused terminals of these flip-flops are tied to plus 5 volts d.c. through resistor 20, of 1,000 ohms resistance. This includes the K and the CLR ("clear") terminals of each.

Clock pulses, derived from the Q output of one-shot 4, enter the decoding logic 3 on conductor 23 and are connected to each CLK terminal of flip-flops 21 and 22.

The Q output of flip-flop 21 is conducted to one input of AND gate 24 and also to the stepper motor driver apparatus for the $\phi$C coil. Similarly, the $\bar{Q}$ output of flip-flop 21 is connected to one input terminal of AND gate 25 and similarly to NAND gate 26.

Forward or reverse information is impressed upon decoding logic 3 to determine which way the motor shall step. A logical "one" of plus 5 volts maintained on terminal 28, with a logical "zero" of zero volts, or ground, being maintained on terminal 27, results in the motor stepping forward. With these logic signals reversed the motor steps backward. These voltages are provided from an external source under control of an operator.

Terminal 27 connects to the second input to AND gate 25 and also to one terminal of another AND gate 30. Terminal 28 connects to the second input terminal of AND gate 24 and also to one terminal of another AND gate 31.

The outputs of AND gates 24 and 25 are connected to the inputs of NOR gate 32. The output thereof is connected to the J terminal of flip-flop 22. As before, the Q terminal of flip-flop 22 is connected to the second input of AND gate 30, while the $\bar{Q}$ terminal is connected to the second input of AND gate 31, and also to the second input of NAND gate 26.

The outputs of AND gates 30 and 31 are connected to the inputs of NOR gate 33, the output of which returns to the J terminal of flip-flop 21.

The outputs $\bar{Q}$ of both flip-flops 21 and 22 are connected to the two inputs of NAND gate 26 and the output of the latter is connected to both inputs of NAND gate 34. Thus series connected these two gates comprise an AND gate. These gates pass a logical "one" signal to the apparatus for the $\phi$B coil of the motor whenever both the Q outputs of the flip-flops are at logical "one".

Similarly, the Q output of flip-flop 22 is connected to the apparatus for the $\phi$A coil of the motor.

The circuitry of phase decoding logic 3 accomplishes forward and reverse decoding for the individual phases of the stepper motor; i.e., formation of three properly timed pulses from one step command pulse. The circuit is that of a simplified decoded counter, with appropriate decoding by AND gate 26-34.

The properly phased pulses then each pass through a further gate and into a pair of transistors comprising motor driving apparatus. This apparatus is now detailed for phase A.

The Q output from flip-flop 22 passes into one input of NAND gate 36. The other input is from the output of O.S. 6. The output from gate 36 is impressed upon the base of transistor 37, which may be an NPN type 2N2222. The base is returned to the plus 5 volts general power supply, which is preferably regulated, through resistor 38, which has a resistance of the order of 510 ohms. The collector of transistor 37 is similarly returned through resistor 39, of 27 ohms. The emitter is returned to ground through resistor 40, of 100 ohms. The output is taken from the emitter, constituting an emitter-follower connection, with a direct connection to the base of power transistor 41, which may be the NPN type 2N 4347. The emitter thereof is connected directly to ground. The collector is connected in series with stepper motor stator coil $\phi$A to a common connection for all such coils to energizing means associated with means 8, to be detailed later.

In an analogous manner, the $\phi$B coil is driven from NAND gate 34 and the output of O.S. 6 through NAND gate 43, motor driver 44 and power transistor 45.

Further, the $\phi$C coil is driven from the Q output of flip-flop 21 and the output of O.S. 6 through NAND gate 46, motor driver 47 and power transistor 48.

Because the drive pulse from logic means 3 and the damping pulse from O.S. 6 occur at different times, gates 36, 43 and 46 function essentially as waveform adders.

High voltage - low voltage means 8 receives an actuating pulse from step command source 1 by direct connection thereto. Thus, this pulse arrives at the same time that the pulse arrives at first O.S. 4. This allows high voltage to be applied to the motor at the earliest possible moment, thereby to most rapidly accelerate the rotor for each step.

This pulse enters one input of OR gate 50. The other input is a connection to plus 5 volts power supply through resistor 51, of 1,000 ohms resistance. The output of gate 50 is connected to one-shot 52, which is of the same type as O.S. 4.

O.S. 52 forms an actuating pulse, typically of 3 milliseconds duration, as shown at 54 in FIG. 2, which pulse is impressed upon the base of transistor 55, of NPN type 2N2222. The emitter thereof is connected directly to ground while the collector is connected to resistor 56, of 5,100 ohms resistance, and therethrough to the base of PNP transistor 57, of 2N2907 type. The emitter of this transistor is connected directly to a source of high voltage power, indicated by terminal 58, the other terminal of which is connected to ground. For the example given a positive voltage of 28 volts is maintained (d.c.) at terminal 58 with respect to ground. The base of transistor 57 is likewise connected to terminal 58, but through resistor 59, of 5,100 ohms. The collector thereof is connected to resistor 60, of 680 ohms, which in turn is connected to common high voltage bus 61, which connects to each of the three stepper motor coils.

The base of NPN power transistor 62, type 2N3715, is connected directly to the collector of transistor 57, for actuation thereby. The collector of transistor 62 is directly connected to terminal 58, while the emitter thereof is directly connected to common bus 61. This collector-emitter circuit is connected directly across resistor 63, of 7.5 ohms resistance and 25 watt rating. Diode 64, a 1N4004, is connected with cathode to bus 61 and anode to ground. This prevents negative inductive voltage surges when transistor 62 shuts off, protecting the transistor.

The circuitry from O.S. 52 through transistor 62 operates to saturate transistor 62 when high voltage is to be applied to bus 61 and to render it non-conducting at other times. In effect, this "shorts out" resistor 63 when high voltage is to be applied to the bus, and allows the resistor to be in circuit without any parallel circuit across it when high voltage is not to be applied. Pulse 54 of FIG. 2 shows the application of high voltage. The axis of this waveform indicates the reduced voltage, essentially of 5 to 6 volts. During saturation, the voltage drop across transistor 62 is of the order of one to two volts, so that essentially all of the plus 28 volts of the power supply is made available across the motor coils.

Thus, each step command to the stepper motor is preceded by a pulse of high voltage, to thereby move the armature (rotor) from its rest position at the greatest possible speed.

Damping, in the form of current in all motor windings, must not be present when the next step command pulse occurs, else the motor malfunctions and will not step. Accordingly, while a damping pulse 19 of relatively considerable duration of two milliseconds is effective at intermediate stepping rates, at high stepping rates it must be shortened. Typically, this may be shortened to 1 millisecond. In the example herein a high stepping rate may be of the order of 400 to 500 steps per second. Below about 300 steps per second the full length of the damping pulse is employed.

Differentiating means 7 is isolated at its input by inverter 65. This may be one part of a 7400 series integrated circuit of the TTL type, as MC7404. The input thereto is taken from the Q output of O.S. 4. The Q output of the same feeds phase decoding logic 3. O.S. 4 serves to isolate the input signals because of other logic processing of the incoming step command.

The output of inverter 65 is connected to series differentiating capacitor 66, which may have a capacitor of 1,000 picofarads. The capacitor is connected to shunt differentiating resistor 67, of 220 ohms, which is also connected to ground. The common connection between capacitor and resistor is connected to output-isolating inverter 68. The output thereof is connected to the reset (R) terminals of both O.S. 5 and O.S. 6.

From the circuit connections and the associated waveforms of FIG. 2 it is seen that a brief negative spike differentiated pulse 70 is obtained for each step command pulse; the leading edge of pulse 12. When the next pulse 12'' is relatively slow in coming, the normal durations of pulses 19 and 16 have been completed and dfferentiation pulse 70 is of no effect. On the other hand, when the next pulse occurs quite rapidly, as at 12', say at a rate of 418 per second as timed for the example of FIG. 2, differentiated pulse 70' occurs before the expiration of the normal duration of pulse 19. This pulse is thus terminated by resetting O.S. 6 and pulse 19 terminates earlier, at 19'.

It is easily seen that as the command pulse rate increased over that indicated, pulse 70' occurs earlier and earlier. Thus pulse 19 is shortened more and more, finally being eliminated. As the pulse rate increases still further, pulse 16 from O.S. 5 is shortened and at the limit may also be eliminated.

It will be recognized that the above-detailed functioning provides highly desirable damping, having a duration suited to the stepping rate and so giving the greatest fidelity of motion in stepping over a wide range of stepping rates.

Damping is an "on" condition, accomplished by energizing all three drive transistors simultaneously. This provides maximum damping of electrical current variation, and so mechanical oscillation of the motor is damped because of generator action.

Zener breakdown of the power drive transistor is an "off" condition. Such transistors are rated for such operation without damage, say for a period of the order of two milliseconds. A relatively high Zener breakdown voltage rating for the transistors is desirable. This has the effect of reducing the time required for dissipating the inductively stored energy from the motor coils. A typical time span for the Zener breakdown is the first 100 $\mu$s of negative pulse 72 for the $\phi$A current; FIG. 2.

An easily understood simplification of the damping circuit and its functioning consists in connecting the output of differentiator 7 only to the reset terminal R of O.S. 6. Then only pulse 19 can be shortened; to elimination in the limit.

It will be understood that the stepping rates and other performance parameters may have different values with different items of apparatus and other condition of operation, but that the mode of variable damping according to this invention will be applicable.

I claim:

1. A stepper motor drive circuit comprising:
    a. a source (1) of step command pulses,
    b. a first relaxation device (4) connected to said source for actuation by step command pulses,
    c. a second relaxation device (5) connected to said first relaxation device for subsequent actuation thereby,
    d. a third relaxation device (6) connected to said second relaxation device for subsequent actuation thereby,
    e. logic means (3) connected to said first relaxation device to provide plural-phase excitation to said stepper motor, and
    f. electric differentiating means (7) connected to said first relaxation device and to said second and third relaxation devices to selectively reset said third and second relaxation devices on each step command pulse,
    whereby said third relaxation device and selectively said second relaxation device are reset prior to the expiration of their normal cycle of actuation when said command pulses occur more rapidly than the full period of the normal cycle of actuation of said third and selectively also said second relaxation devices.

2. The circuit of claim 1 in which the logic means (3) includes;
a. a semiconductor device (as 41) connected in the circuit of each of the plural phases (as φA) exciting said stepper motor to,
1. power said stepper motor in accordance with said step command pulses, and also
2. rapidly dissipate residual electrical energy remaining in the electrical circuit of said stepper motor by Zener breakdown of said semiconductor device.

3. The circuit of claim 2, in which;
a. said semiconductor device is a power transistor (as 41), and
b. the collector-base diode thereof suffers Zener breakdown.

4. The circuit of claim 1 in which said differentiating means (7) includes;
a. input isolation means (65),
b. a resistor (67) - capacitor (66) differentiating circuit, and
c. output isolation means (68).

5. The circuit of claim 1 in which;
a. said differentiating means (7) produces an output pulse simultaneously with the leading edge of each said command pulse,
whereby damping of said stepper motor by the output of at least said third relaxation device is reduced in duration near and at the maximum command pulse repetition rate.

6. The circuit of claim 5 in which;
a. said damping of the stepper motor is further reduced in duration at said maximum command pulse repetition rate by the output of said differentiating means resetting said second relaxation device (5).

7. The circuit of claim 1, which additionally includes high voltage - low voltage means (8) having;
a. a triggerable relaxation device (52) connected to said source of step command pulses,
b. a source of high voltage (58),
c. impedance means (63) connected between said source of high voltage and the plural phases (φA, φB & φC) of said stepper motor, and
d. saturable semiconductor means (62) connected for actuation by said triggerable relaxation device and connected across said impedance means (63) for essentially bypassing said impedance means when in the saturated state.

8. The circuit of claim 1 in which said logic means (3) includes;
a. a gate (36, 43 or 46) for each of the plural phases,
b. a connection (23) from said first relaxation device (4) to the input of said logic means,
c. a connection from each phase of the output of said logic means to one of said gates, and
d. a connection from said third relaxation device (6) to each of said gates,
whereby a said energizing pulse is passed on from said logic means for energizing said motor, and a damping pulse is passed on from said third relaxation device for subsequently damping said motor.

9. The circuit of claim 1, in which;
a. said electrical differentiating means (7) is connected only to said first and third relaxation devices, and
b. only said third relaxation device (6) is reset prior to the expiration of its normal cycle of actuation when said command pulses occur more rapidly than the full period of the normal cycle of actuation of said third relaxation device.

10. The method of operating a stepper motor in which each step is initiated by a drive pulse and thereafter is damped by an electrical damping pulse (19) applied to stop rotation thereof at low stepping rates, and the damping effectiveness of the damping pulse is progressively reduced (19') at higher stepping rates by altering the duration of the damping pulse as an inverse function of the stepping rate.

11. The method of claim 10 in which the damping pulse is eliminated while the stepper motor steps at a high stepping rate.

* * * * *